United States Patent
Takada

(10) Patent No.: US 8,073,132 B2
(45) Date of Patent: Dec. 6, 2011

(54) ECHO CANCELER AND ECHO CANCELING PROGRAM

(75) Inventor: Masashi Takada, Yokohama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 603 days.

(21) Appl. No.: 12/289,882

(22) Filed: Nov. 6, 2008

(65) Prior Publication Data

US 2009/0074177 A1 Mar. 19, 2009

(30) Foreign Application Priority Data

Nov. 6, 2007 (JP) ................................ 2007-288404

(51) Int. Cl.
*H04M 9/08* (2006.01)
(52) U.S. Cl. .................... 379/406.01; 370/286; 455/570
(58) Field of Classification Search ............ 379/406.01; 370/286; 455/570
See application file for complete search history.

(56) References Cited

U.S. PATENT DOCUMENTS 5,559,881 A * 9/1996 Sih .......................... 379/406.08
5,740,242 A    4/1998 Hayashi

FOREIGN PATENT DOCUMENTS

EP    1152547    11/2001
JP    08-237174    9/1996

OTHER PUBLICATIONS

Haykin, *Tekio firuta nyumon* (Japanese translation of *Introduction to Adaptive Filters*), Gendaikogakusha, Sep. 1987.
*Denwa sabisu no intafesu* (Telephone service interface), 5th edition, Nippon Telegraph and Telephone Corporation, 1998, p. 19.

* cited by examiner

*Primary Examiner* — Walter F Briney, III
(74) *Attorney, Agent, or Firm* — Rabin & Berdo, P.C.

(57) ABSTRACT

An echo canceller uses an adaptive filter to remove an echo of an incoming far-end signal from an outgoing near-end signal. Filter coefficients are calculated and updated while the far-end signal is active so as to minimize the residual echo. In addition, the far-end signal and near-end signal are sampled to generate simulated far-end and near-end signals, from which substitute filter coefficients are similarly calculated while the far-end signal is silent. When the far-end signal changes from silent to active, the substitute filter coefficients are swapped in as initial values for the filter coefficients, thereby speeding up subsequent convergence of the filter coefficients without significant added computational cost.

16 Claims, 11 Drawing Sheets

FIG.6

| v_flag | Steals_adapt_go | NORMAL ADAPTIVE FILTER | SILENT ADAPTIVE FILTER |
|---|---|---|---|
| 0 | 0 | DOES NOT OPERATE | DOES NOT ADAPT |
| 1 | 0 | ADAPTS | DOES NOT ADAPT |
| 0 | 1 | DOES NOT OPERATE | ADAPTS |
| 1 | 1 | ADAPT | DOES NOT ADAPT |

ECHO CANCELER AND ECHO CANCELING PROGRAM

BACKGROUND OF THE INVENTION

1. Field of the Invention

The present invention relates to an echo canceler and an echo canceling program applicable to, for example, a hands-free telephone terminal.

2. Description of the Related Art

With the recent proliferation of voice over Internet protocol (VoIP) telephony, telephone rates have come down and people can make telephone calls from their homes and offices with reduced concern about telephone bills. As a result, in many cases the calls last longer. This has led to a sudden rise in the demand for hands-free telephone sets as a means of avoiding the discomfort caused by holding a telephone receiver pressed against the ear for an extended period of time.

The simplest types of hands-free telephone sets employ earphones or headphones, but earphones rub against the ear canal and cause painful inflammation, while headphones cause irritation and fatigue if worn for a long time. The most popular type of hands-free telephone set is the speakerphone, which employs a loudspeaker instead of an earphone or headphones.

An essential part of a speakerphone is an acoustic echo canceler that removes the echo of the acoustic output of the loudspeaker from the signal input through the microphone. An essential part of an acoustic echo canceler is its adaptive filter, which has tap coefficients that mimic the effect of the acoustic echo path. A key part of the adaptive filter is the algorithm used to update the tap coefficients for optimum echo cancellation.

Many acoustic echo cancelers employ the normalized least mean squares (NLMS) algorithm, described by Haykin in *Introduction to Adaptive Filters* (Macmillan, Jun. 1984, Japanese translation published by Gendaikogakusha, September 1987). The NLMS algorithm has the advantage of excellent stability, which offsets its disadvantages of relatively slow convergence for so-called 'colored signals' with a non-flat frequency spectrum. Voice signals are typically colored in this sense.

Although the NMLS algorithm remains an excellent choice for some purposes, the purposes for which speakerphones are needed are diversifying. In the past, speakerphones mainly had to satisfy the demands of hands-free use in corporate conference-room systems, in which system size and cost were not major considerations. Now there is also a need for high-performance speakerphones that are small and inexpensive enough to be used in ordinary homes. In addition, the spread of VoIP has led to the introduction of wideband telephony, which provides better speech quality than conventional telephony, so speakerphones and their adaptive filters must also be able to cope with wideband voice signals.

If the conventional NLMS filter updating algorithm is applied in an echo canceler for wideband telephony, problems arise in relation to both stability and computational load. These problems arise from the increased sampling rate. If the signal bandwidth is doubled, for example, then the sampling rate also doubles, from the conventional eight thousand samples per second (8 kHz) to sixteen thousand samples per second (16 kHz), so twice as much data must be processed per unit time.

In contrast, the temporal length or impulse response length of the echo path from the speaker to the microphone is determined by physical factors such as the distance between the speaker and the microphone, the speed of sound, the number of different echo paths, and the presence of reflections, and is independent of the sampling rate. Therefore, if the sampling rate rises, the necessary number of tap coefficients in the adaptive filter (the tap length of the filter) increases and the convergence speed of the adaptive filter is slowed accordingly.

Haykin discloses methods of speeding up the convergence of the NLMS algorithm, but these methods require complex calculations, imposing an increased computational load and requiring increased computational resources, including increased memory capacity. They also compromise the stability of filter. In short, these methods are expensive, requiring extra hardware and software, and they produce unreliable speech quality.

Continued use of the conventional NLMS algorithm for wideband adaptive filtering is also problematic, however. Due to the existing performance problems of this algorithm for colored signals and its decreased convergence speed due to increased tap length, speech quality is degraded by unremoved echo.

In Japanese Patent Application Publication No. 08-237174, Igai discloses a method of overcoming these problems by continuous optimization of the step gain in the NLMS algorithm. A large initial step gain is employed, so that the algorithm starts by converging quickly. As convergence progresses, the step gain is reduced so that the algorithm can model the echo accurately under steady-state conditions.

Continuous optimization of the step gain, however, fails to solve the problem of poor convergence for colored signals, and introduces new problems. For example, if voice input is preceded by a call control tone, and if the algorithm converges while the call control tone is being received, then the reduced step size delays adaptation to the echo characteristics of the voice signal.

SUMMARY OF THE INVENTION

An object of the present invention is to provide a small and inexpensive echo canceler that converges rapidly.

Another object of the invention is to provide an echo canceler suitable for wide-band telephony.

The invention provides an echo canceler having a filter for generating an echo replica signal from a far-end input signal and an echo-component remover for using the echo replica signal to remove an echo component included in a near-end input signal. The echo canceler includes a voice detector for detecting an active state and a silent state of the far-end input signal, and a filter coefficient adapter for iteratively determining first coefficients for the filter from the near-end input signal, after the echo component has been removed, and setting the determined filter coefficients in the filter while the active state is detected by the voice detector.

A data selector samples the far-end input signal and the near-end input signal to obtain samples from which a simulated signal generator generates a simulated far-end input signal and a simulated near-end input signal.

From the simulated far-end input signal and the simulated near-end input signal, an initial coefficient calculator calculates second coefficients for removing an echo of the simulated far-end signal from the simulated near-end input signal. A first initializer replaces the first coefficients with the second coefficients when a transition from the silent state to the active state is detected, so that the second coefficients become initial values of the first coefficients during the next period of adaptation of the first coefficients.

The invention also provides a machine-readable medium storing a program executable by a computing device to carry out functions equivalent to the above.

In a typical telephone conversation in which active and silent intervals are interspersed, samples obtained previously can be used to simulate voice input and calculate the second coefficients during the silent intervals. Setting the second coefficients in the filter as initial values of the first coefficients when the next active interval begins enables convergence to proceed quickly. The first and second coefficients can both be calculated in the same way, and since they are not calculated simultaneously, extra computational resources are not required. The invented echo canceler accordingly provides the higher convergence speed needed for dealing with wide-band voice signals without significant extra cost.

BRIEF DESCRIPTION OF THE DRAWINGS

In the attached drawings:

FIG. 6 is a table indicating when normal and silent adaptive operations are performed;

DETAILED DESCRIPTION OF THE INVENTION

Figure 1:
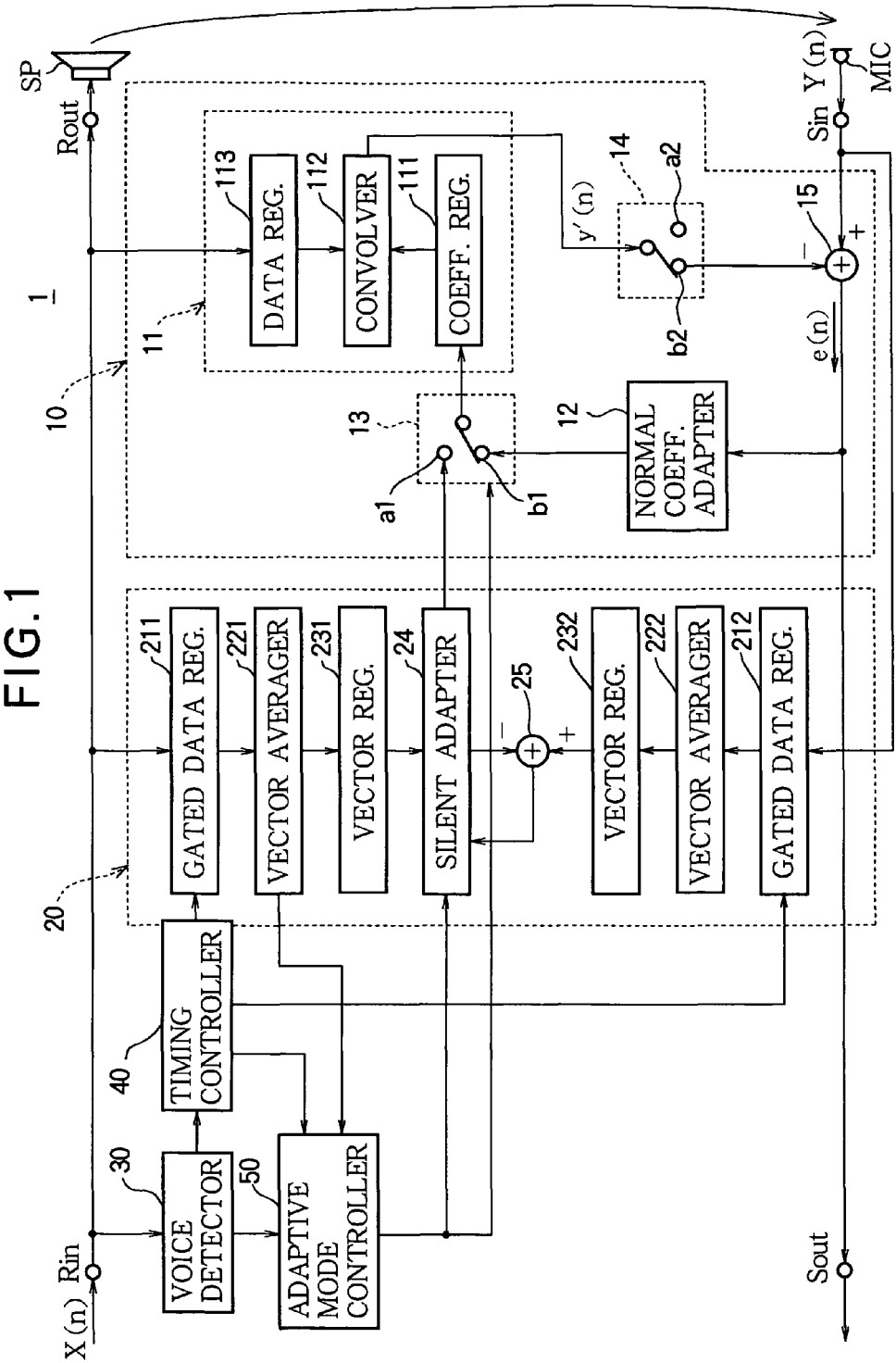
FIG. 1 is a block diagram of an echo canceler according to a first embodiment of the invention.

Embodiments of the invention will now be described with reference to the attached drawings, in which like elements are indicated by like reference characters. The embodiments are adaptive filters employed in speakerphones, but it will be appreciated that the invention is not limited to use in speakerphones. The abbreviations COEFF. (coefficient) and REG. (register) will be used in the drawings. The term 'register' denotes a register file or memory area for storing multiple data or coefficient values.

First Embodiment

Referring to the block diagram in FIG. 1, a far-end input signal x(n) input by a far-end party (not shown) is routed via the receiving input terminal Rin and receiving output terminal Rout of the speakerphone to its speaker SP, from which an acoustic signal is output and heard by the near-end party (not shown). The acoustic signal is also picked up by the speakerphone's microphone MIC, and is routed toward the far-end party as an echo y(n) through a sending input terminal Sin and sending output terminal Sout. The echo canceler 1 has the function of removing or reducing this acoustic echo. If the speakerphone includes a two-wire/four-wire conversion circuit (also referred to as a hybrid circuit) that produces an electrical echo (referred to as a line echo), the echo canceler 1 may also be used to remove or reduce the line echo.

The echo canceler 1 includes a normal adaptive filter section 10, a silent adaptive filter section 20, a voice detector 30, a timing controller 40, and an adaptive mode controller 50.

If the far-end signal x(n) is a digital signal, then a digital-to-analog (D/A) converter may be provided to convert the signal to an analog signal for output by the speaker SP. If the far-end signal x(n) is an analog signal, then an analog-to-digital (A/D) converter may also be provided to convert the signal to a digital signal for processing by the echo canceler 1. Similarly, an A/D converter may be provided to convert the microphone output signal to a digital signal for input at the sending input terminal Sin. In the following description it will be assumed that all processing by the echo canceler 1 is digital. The A/D and D/A converters are omitted from the drawings for simplicity.

The echo canceler 1 may be implemented on a digital signal processor (DSP) or in an application-specific integrated circuit. Alternatively, the echo canceler 1 may be implemented on a general-purpose computing device having a central processing unit (CPU), read-only memory (ROM), random access memory (RAM), electrically programmable erasable read-only memory (EEPROM), hard disk drive, and other well-known facilities, by providing a machine-readable medium storing an echo canceling program and installing the echo canceling program in the computing device. In this case the elements of the echo canceler 1 shown in FIG. 1 correspond to parts of the echo canceling program.

The voice detector 30 detects the active state and silent state of the far-end input signal x(n) received at the receiving input terminal Rin, and sends a signal indicating the active state or the silent state to the timing controller 40 and adaptive mode controller 50.

The active and silent states may be detected by taking the difference between a long-term average and a short-term average of the signal power. For example, if LPO_L is the long-term average power calculated over an interval of five seconds and LPO_S is the short-term average power calculated over an interval of thirty milliseconds (30 ms) the active state may be detected when the following condition is satisfied, where $VD\_\delta$ is a predetermined detection margin such as six decibels (6 dB).

$$LPO\_S \geq LPO\_L + VD\_\delta \qquad (1)$$

When this condition is not satisfied, the silent state is detected.

The signal sent from the voice detector 30 to the timing controller 40 and adaptive mode controller 50, denoted v_flg below, may be, for example, a bi-level signal with values of one (v_flg=1) designating the active state and zero (v_flg=0) designating the silent state, as in the following description.

The normal adaptive filter section 10 and silent adaptive filter section 20 both carry out adaptation operations for updating the tap coefficients used in the normal adaptive filter section 10, but not simultaneously. The normal adaptive filter section 10 adapts only when the voice detector 30 detects the active state. The silent adaptive filter section 20 adapts only when the voice detector 30 detects the silent state. There may also be intervals during the active and silent states when no adaptation operations are carried out. Details will be given later.

The normal adaptive filter section 10 comprises an echo replicator 11, a normal coefficient adapter 12, a pair of switches 13, 14, and a subtractor 15, shown as an adder with one negative input terminal.

The echo replicator 11, operating as a digital filter, generates an echo replica signal y'(n). The echo replicator 11 comprises a coefficient register 111, a convolver 112, and a data register 113.

The coefficient register 111 stores the coefficients used in the normal adaptive filter section 10 as a coefficient vector, and supplies the coefficient vector to the convolver 112. The coefficient register 111 receives the coefficient vector from the normal coefficient adapter 12 or the silent adaptive filter section 20 through switch 13, as described later.

The data register 113 stores data values of the far-end input signal x(n), and supplies the data values to the convolver 112.

The convolver 112 convolves the data stored in the data register 113 with the coefficient vector stored in the coefficient register 111, by multiplying the data values by the corresponding coefficient values and summing the results. The convolver 112 thereby generates the echo replica signal y'(n), and supplies the echo replica signal y'(n) to the subtractor 15 through switch 14, as described later.

The subtractor 15 receives the near-end signal from the sending input terminal Sin and subtracts the echo replica signal y'(n), when switch 14 is closed, to generate a residual signal e(n), which is sent from the sending output terminal Sout to the far-end party. The residual signal e(n) is also supplied to the normal coefficient adapter 12.

The normal coefficient adapter 12, calculates a coefficient vector from the residual signal e(n) and far-end input signal data, and supplies the coefficient vector to the coefficient register 111 through switch 13 for use in generating the next echo replica signal y'(n+1). As described later, the normal coefficient adapter 12 halts these adaptation operations when the far-end signal is silent, and may also halt these adaptation operations when it detects a near-end signal other than the echo y(n), as when the near-end party is talking.

The silent adaptive filter section 20 gathers near-end and far-end signal data and simulates the operation of the normal adaptive filter section 10 while the far-end signal is silent, thereby generating coefficient data that adapted to the echo path. The generated coefficient data are supplied through switch 13 to the echo replicator 11.

Switches 13 and 14 operate under control of the adaptive mode controller 50. Switch 13, operating as a first initializer, supplies the coefficient register 111 with a coefficient vector from either the normal coefficient adapter 12 or the silent adaptive filter section 20. Switch 14 supplies the subtractor 15 either with the echo replica signal y'(n) output from the convolver 112 or with no signal. For simplicity, the control signal line from the adaptive mode controller 50 to switch 14 is omitted from the drawing.

The silent adaptive filter section 20 comprises a pair of gated data registers 211, 212, which constitute a data selector; a pair of vector averagers 221, 222, which constitute a simulated signal generator; a pair of vector registers 231, 232; a silent adapter 24; and a subtractor 25. The silent adapter 24 and subtractor 25 constitute an initial coefficient calculator.

At timings designated by the timing controller 40 (while a KEEP signal output by the timing controller 40 is active), gated data register 211 collects samples x(n) of the far-end signal at the predetermined sampling rate and supplies the sample values to vector averager 221. Similarly, gated data register 212 collects samples y(n) of the near-end signal at the predetermined sampling rate and supplies the sample values to vector averager 222.

Vector averager 221 averages sample values x(n) of the far-end input signal stored in gated data register 211 to generate a data vector, which is stored in vector register 231. Vector averager 222 simultaneously averages sample values y(n) of the near-end input signal stored in gated data register 212 to generate a data vector which is stored in vector register 232. Each time it generates a data vector, vector averager 221 outputs a control signal denoted steals_adapt_go to the adaptive mode controller 50, indicating that preparations for updating the tap coefficients in the silent state are complete. (The word 'steals' is used as an acronym for 'silent term enhanced adaptation loading system'.)

Vector register 231 supplies data taken from the data vector received from vector averager 221 to the data register 243 in the silent adapter 24.

Vector register 232 supplies data taken from the data vector received from vector averager 222 to the subtractor 25.

Figure 2:
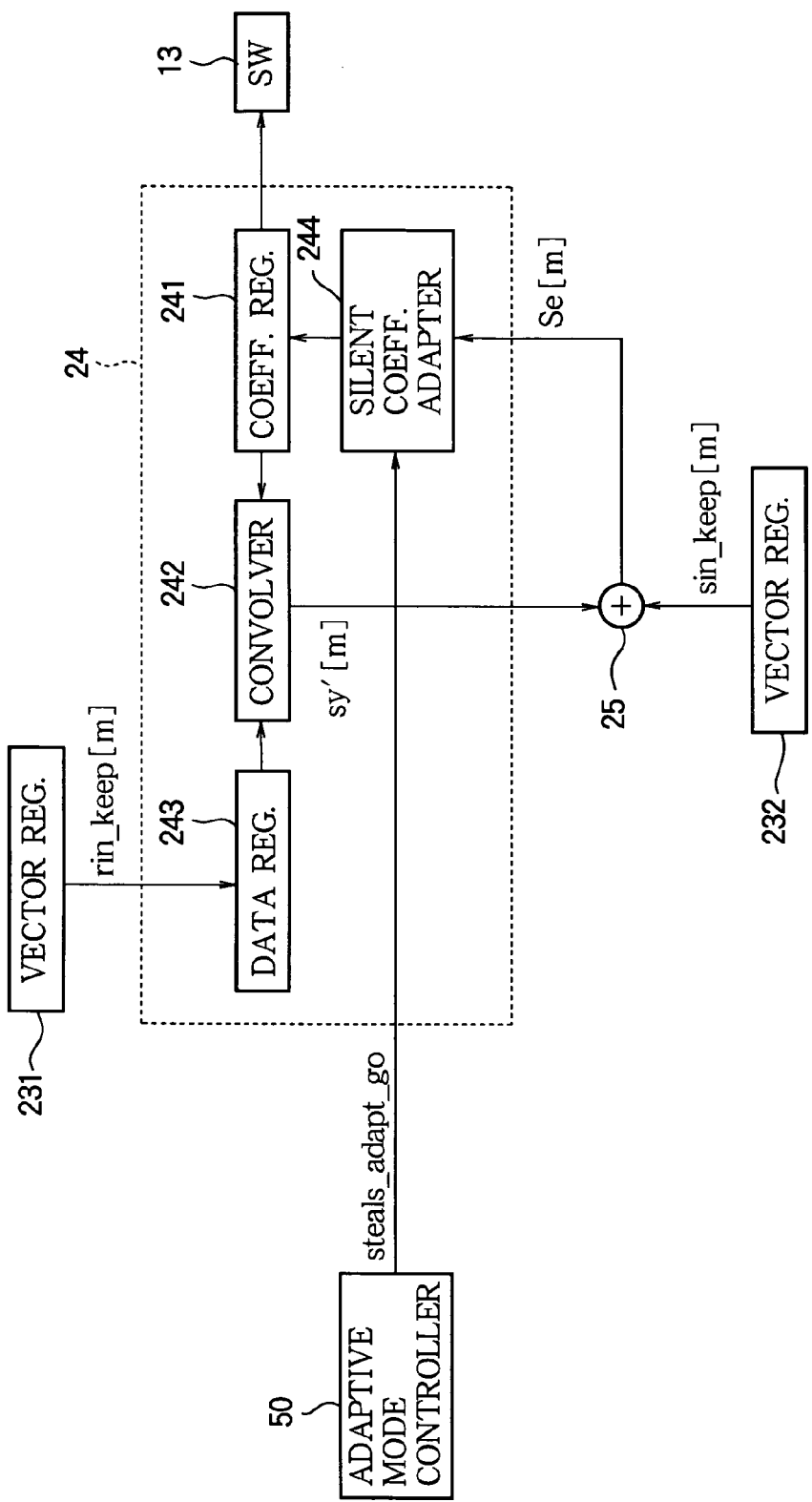
FIG. 2 is a block diagram illustrating the internal structure of the silent adapter in the first embodiment.

Referring to FIG. 2, the silent adapter 24 comprises a coefficient register 241, a convolver 242, a data register 243, and a silent coefficient adapter 244.

Data register 243 stores the data vector received from vector register 231, and supplies this data vector to convolver 242.

Coefficient register 241 receives a coefficient vector from the silent coefficient adapter 244, and supplies the coefficient vector to convolver 242 and switch 13.

Convolver 242 convolves the data vector stored in data register 243 with the coefficient vector received from coefficient register 241, by multiplying the data values by the corresponding coefficient values and summing the results, and supplies the sum to subtractor 25.

Subtractor 25 subtracts the sum received from convolver 242 from the data vector received from vector register 232 to generate a residual value, which is sent to the silent coefficient adapter 244.

The silent coefficient adapter 244 receives the residual signal from the subtractor 25, calculates tap coefficients for use in the normal adaptive filter section 10, and supplies the tap coefficients to coefficient register 241.

Referring again to FIG. 1, from the v_flg control signal received from the voice detector 30, the timing controller 40 generates the KEEP signal supplied to the silent adaptive filter section 20 to control the collection of samples of the near-end and far-end signals. The timing controller 40 asserts the KEEP signal for a certain period starting each time the v_flg control signal changes from zero to one (each transition from v_flg=0 to v_flg=1).

The adaptive mode controller 50 receives the v_flg and KEEP control signals from the voice detector 30 and the timing controller 40, and controls the normal adaptive filter section 10 and silent adaptive filter section 20.

When the v_flg control signal is asserted (v_flg=1) the adaptive mode controller 50 connects switch 13 to terminal_b1 and switch 14 to terminal_b2. The coefficient register 111 in the echo replicator 11 then receives the coefficient vector calculated in the normal coefficient adapter 12, and the subtractor 15 receives the echo replica signal y'(n) generated by the convolver 112 in the echo replicator 11.

When the v_flg control signal is inactive (v_flg=0), the adaptive mode controller 50 connects switch 13 to terminal_a1 and switch 14 to terminal_a2. The coefficient register 111 in the echo replicator 11 then receives the coefficient vector calculated in the silent adapter 24 in the silent adaptive filter section 20, and the subtractor 15 does not receive the echo replica signal y'(n) generated in the convolver 112 in the echo replicator 11.

The adaptive mode controller 50 also controls the operation of the silent coefficient adapter 244 in the silent adapter 24 on the basis of the v_flg control signal received from the voice detector 30 and a keep_flag_on_to_off control signal received from vector averager 221. Details will be given later.

Next, the operation of the echo canceler 1 in the first embodiment will be described.

First, the operation of the normal adaptive filter section 10 will be described.

In the initial state, switch 13 is connected to terminal_b1, and switch 14 is connected to terminal_b2.

First, N consecutive samples of the far-end input signal x(n) received at the receiving input terminal Rin are stored in data register 113. The stored samples may be treated as a data vector X(n) expressed by the following equation (2).

$$X(n)=[x(n), x(n-1), \ldots, x(n-N+1)]^t \quad (2)$$

The letter n is the sample number, N is the tap length (e.g., 1024), and the superscript t denotes transposition. Accordingly, X(n) is a column vector of the N most recently received far-end signal samples up to and including time n.

X(n) will also be denoted Xn where convenient below. Similarly, near-end data vectors will be denoted both Y(n) and Yn as convenient.

The coefficient register 111 stores N tap coefficients. The normal coefficient adapter 12 constantly updates the N coefficient values. The N tap coefficients stored in the normal coefficient adapter 12 may be treated as a coefficient vector H(n) expressed by the following equation (3).

$$H(n)=[h(0), h(1), \ldots, h(N-1)]^t \quad (3)$$

Convolver 112 receives the coefficient vector H(n) stored in the coefficient register 111 and the data vector X(n) stored in data register 113, and calculates the single-valued scalar product y'(n) of the coefficient vector H(n) and the data vector X(n) expressed by the following equation (4). The scalar product y'(n) is the echo replica signal y'(n).

$$y'(n)=H^t(n)X(n) \quad (4)$$

Switch 14 receives the echo replica signal y'(n) generated as described above. Since switch 14 is initially connected to terminal_b2 under control of the adaptive mode controller 50, the subtractor 15 receives the echo replica signal y'(n).

The subtractor 15 subtracts the echo replica signal y'(n) from the echo y(n) picked up by the microphone MIC to generate the residual signal e(n), expressed by the following equation (5), which is sent to the sending output terminal Sout.

$$e(n)=y(n)-y'(n) \quad (5)$$

From the sending output terminal Sout, the residual signal e(n) is transmitted to the far-end party (not shown) The subtractor 15 also sends the residual signal e(n) to the normal coefficient adapter 12. The normal coefficient adapter 12 uses the NLMS algorithm expressed by the following equation (6), for example, to calculate new tap coefficients for use in the normal adaptive filter section 10, and updates the coefficient values. X(n) in equation (6) is the same data vector as stored in data register 113.

$$H(n+1) = H(n) + \alpha \frac{X(n)e(n)}{\sum_{i=0}^{N-1} x^2(n-i)} \quad (6)$$

The normal coefficient adapter 12 sends the updated coefficient vector H(n+1) to the coefficient register 111 for use in generating the next echo replica signal y'(n+1). Over repeated updates, normally the absolute value of the residual signal e(n) in equation (5) gradually diminishes to the point where the update computation in equation (6) leaves the coefficient vector substantially unchanged. This state is described by saying that the normal adaptive filter section 10 has converged. The normal adaptive filter section 10 can then accurately cancel the echo y(n), and continues to do so as long as the v_flg control signal from the voice detector 30 remains active (v_flg=1).

Next, the details of the operation of the silent adaptive filter section 20 will be described.

As noted above, when the voice detector 30 detects a transition from the silent to the active state of the far-end input signal x(n) and asserts the v_flg control signal (v_flg=1), the timing controller 40 asserts the KEEP signal for a predetermined period. While the KEEP signal is active, gated data register 211 collects and temporarily stores samples of the far-end signal x(n), and gated data register 212 collects and temporarily stores samples of the near-end signal y(n).

At an inactive-to-active transition of the v_flg control signal (a transition from v_flg=0 to v_flg=1), the timing controller 40 starts counting at the sampling rate and asserts the KEEP signal until the sample count reaches a predetermined value denoted LENGTH, regardless of further changes of the far-end input signal between the active and silent states. A typical value of the LENGTH parameter is 38,400 samples. These samples may include both active-state data and silent-state data.

Figure 3:
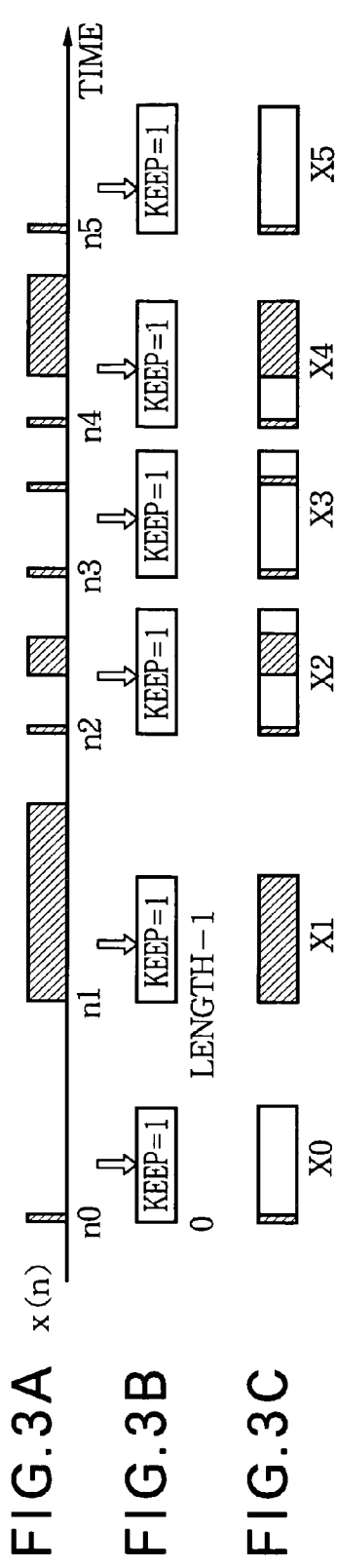
FIGS. 3A to 3F are timing diagrams illustrating the operation of the gated data registers in the first embodiment.

FIG. 3A schematically illustrates exemplary intervals in which the far-end input signal x(n) is active (the hatched intervals) and silent. The voice detector 30 asserts the v_flg control signal (v_flg=1) during the hatched intervals.

FIG. 3B shows the corresponding sampling windows, that is, the intervals during which the timing controller 40 asserts the KEEP signal and samples of the far-end signal are collected. Once a sampling window opens at the timing of a transition from v_flg=0 to v_flg=1, the window remains open for the predetermined length (LENGTH), regardless of further transitions of the v_flg control signal.

FIG. 3C schematically illustrates six exemplary data vectors X0 to X5 expressed by the following equation (7), which are generated from the collected samples of the far-end signal under control of the timing controller 40.

$$\left.\begin{aligned} X0 &= [x(n0), \ldots, x(n0 + \text{LENGTH} - 1)] \\ X1 &= [x(n1), \ldots, x(n1 + \text{LENGTH} - 1)] \\ X2 &= [x(n2), \ldots, x(n2 + \text{LENGTH} - 1)] \\ X3 &= [x(n3), \ldots, x(n3 + \text{LENGTH} - 1)] \\ X4 &= [x(n4), \ldots, x(n4 + \text{LENGTH} - 1)] \\ X5 &= [x(n5), \ldots, x(n5 + \text{LENGTH} - 1)] \end{aligned}\right\} \quad (7)$$

In FIGS. 3A and 3C, for simplicity, the far-end input signal X(n) is shown as having a constant fixed amplitude during the hatched intervals. Six is the maximum number of data vectors that can be stored at once in this embodiment, although the invention is not limited to this particular number.

During these sampling windows, while the timing controller 40 asserts the KEEP signal, gated data register 212 also collects and stores samples y(n) of the near-end signal received from the sending input terminal Sin. Accordingly, this sampling also starts at timings controlled by the v_flg control signal output by the voice detector 30 on the basis of activity at the receiving input terminal Rin. As noted above, the echo y(n) includes a delay (d) representing the temporal length of the echo path.

FIG. 3D schematically illustrates exemplary intervals in which the echo y(n) is active (the hatched intervals) and silent. FIG. 3E shows the corresponding sampling windows, during which gated data register 212 collects samples y(n) of the echo of the far-end input signal in FIG. 3A, delayed by the echo path and picked up by the microphone MIC, and generates the data vectors Y0 to Y5 shown in FIG. 3F. The sampling windows in FIG. 3E are the intervals during which the timing controller 40 asserts the KEEP signal, and are identical to the sampling windows in FIG. 3B. The data vectors can be expressed by the following equation (8).

$$\left.\begin{array}{l} Y0 = [y(n0), \ldots, y(n0 + \text{LENGTH} - 1)] \\ Y1 = [y(n1), \ldots, y(n1 + \text{LENGTH} - 1)] \\ Y2 = [y(n2), \ldots, y(n2 + \text{LENGTH} - 1)] \\ Y3 = [y(n3), \ldots, y(n3 + \text{LENGTH} - 1)] \\ Y4 = [y(n4), \ldots, y(n4 + \text{LENGTH} - 1)] \\ Y5 = [y(n5), \ldots, y(n5 + \text{LENGTH} - 1)] \end{array}\right\} \quad (8)$$

As the gated data registers 211, 212 continue to collect samples and store data vectors, when the predetermined maximum number of data vectors have been stored, further data vectors are cyclically overwritten onto the stored data vectors. In this embodiment, for example, since the predetermined maximum number of data vectors is six, when data vectors X(5) and Y(5), also denoted X5 and Y5, have been stored, the next pair of data vectors $$X6=[x(n6), \ldots, x(n6+\text{LENGTH}-1)]$$

$$Y6=[y(n6), \ldots, y(n6+\text{LENGTH}-1)]$$

are overwritten on the first pair of data vectors $$X0=[x(n0), \ldots, x(n0+\text{LENGTH}-1)]$$

$$Y0=[y(n0), \ldots, y(n0+\text{LENGTH}-1)]$$

and storage proceeds thereafter as in a ring buffer.

Vector averager 221 receives data vectors X(n) from gated data register 211 and vector averager 222 receives data vectors Y(n) from gated data register 212. Each time a new data vector has been assembled, the gated data registers 211, 212 send respective timing signals (keep_flg_on_to_off=1) to the vector averagers 221, 222. At other times, the timing signals are left in the inactive state (keep_flg_on_to_off=0). When the timing signals are asserted (keep_flg_on_to_off=1), the vector averagers 221, 222 calculate the average of the most recently received data vectors.

Since gated data register 211 and gated data register 212 output the keep_flg_on_to_off timing signal at identical timings, gated data register 211, for example, may supply the keep_flg_on_to_off timing signal to both vector averagers 221 and 222.

Initially, before the number of the stored data vectors has reached the predetermined maximum number (denoted FULL_PILE), the vector averagers 221, 222 average the number (denoted pile_cnt) of data vectors actually stored. In this embodiment (FULL_PILE=6), once six data vectors X(0) to X(5) and Y(0) to Y(5) have been stored, the vector averagers 221, 222 calculate moving averages of six data vectors, but before that time, they calculate running averages of fewer than six data vectors.

Since the operation of vector averager 222 differs from the operation of vector averager 221 only in that it receives data vectors Y(n) representing the echo instead of data vectors X(n) representing the far-end input signal, only the averaging calculation performed by vector averager 221 will be described below.

Vector averager 221 calculates averages of pile_cnt (pile_cnt=1 to 6) data vectors, and eventually obtains the averages of the predetermined maximum number FULL_PILE of data vectors as expressed by the following equations (9) and (10). When the first data vector X(0), denoted X0 below for simplicity, is stored, pile_cnt is initialized to one (pile_cnt=1). As successive data vectors Xn are stored, pile_cnt is incremented one by one until six is reached (pile_cnt=6=FULL_PILE), as follows.

$$X0=[x(n0), \ldots, x(n0+\text{LENGTH}-1)] \rightarrow \text{pile\_cnt}=1$$

$$X1=[x(n1), \ldots, x(n1+\text{LENGTH}-1)] \rightarrow \text{pile\_cnt}=2$$

$$X2=[x(n2), \ldots, x(n2+\text{LENGTH}-1)] \rightarrow \text{pile\_cnt}=3$$

$$X3=[x(n3), \ldots, x(n3+\text{LENGTH}-1)] \rightarrow \text{pile\_cnt}=4$$

$$X4=[x(n4), \ldots, x(n4+\text{LENGTH}-1)]\text{''pile\_cnt}=5$$

$$X5=[x(n5), \ldots, x(n5+\text{LENGTH}-1)] \rightarrow \text{pile\_cnt}=6=\text{FULL\_PILE}$$

When the timing signal is asserted (keep_flg_on_to_off=1), the vector averagers 221, 222 average the data vectors actually stored to generate input vectors steals_rin and steals_sin as simulated far-end and near-end input signals.

More specifically, vector averager 221 generates the following data vector $$\text{steals\_rin}=[\text{rin\_keep}[0], \ldots, \text{rin\_keep}(\text{LENGTH}-1)]$$

by averaging the Xn vectors, and vector averager 222 generates the following data vector $$\text{steals\_sin}=[\text{sin\_keep}[0], \ldots, \text{sin\_keep}(\text{LENGTH}-1)]$$

by averaging the Yn data vectors. The elements rin_keep[k] and sin_keep[k] are expressed by the following equations (9) and (10).

$$\text{rin\_keep}[k] = \frac{\sum_{i=0}^{pile\_cnt-1} x(ni+k)}{pile\_cnt} \quad (9)$$

$$\text{sin\_keep}[k] = \frac{\sum_{i=0}^{pile\_cnt-1} y(ni+k)}{pile\_cnt} \quad (10)$$

Figure 4:
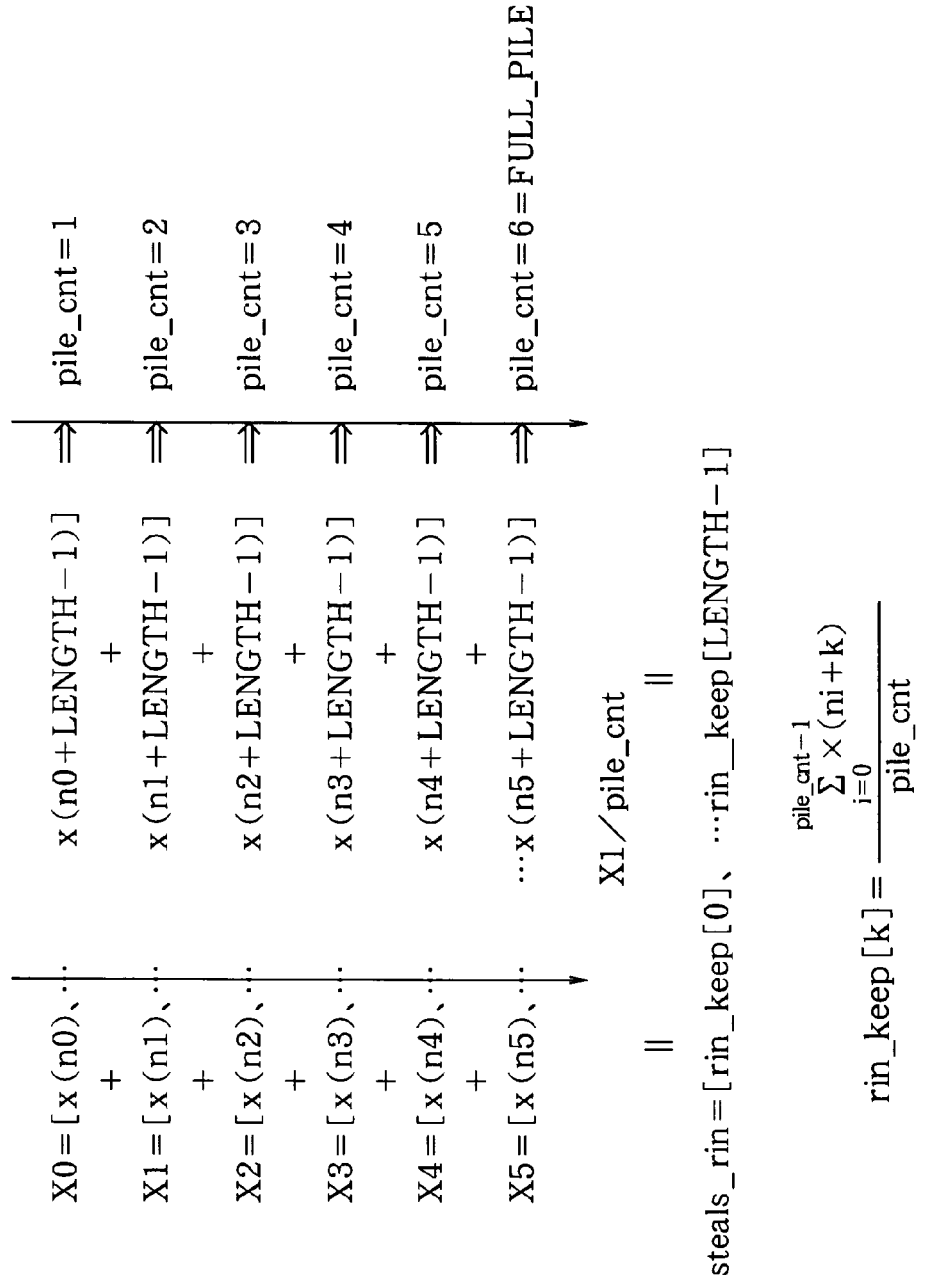
FIG. 4 illustrates the averaging calculation performed in the vector averagers in the first embodiment.

The averaging process is summarized in FIG. 4. Successive averaging calculations proceed in the direction of the arrows.

Figures 5A, 5B, 5C, 5D:
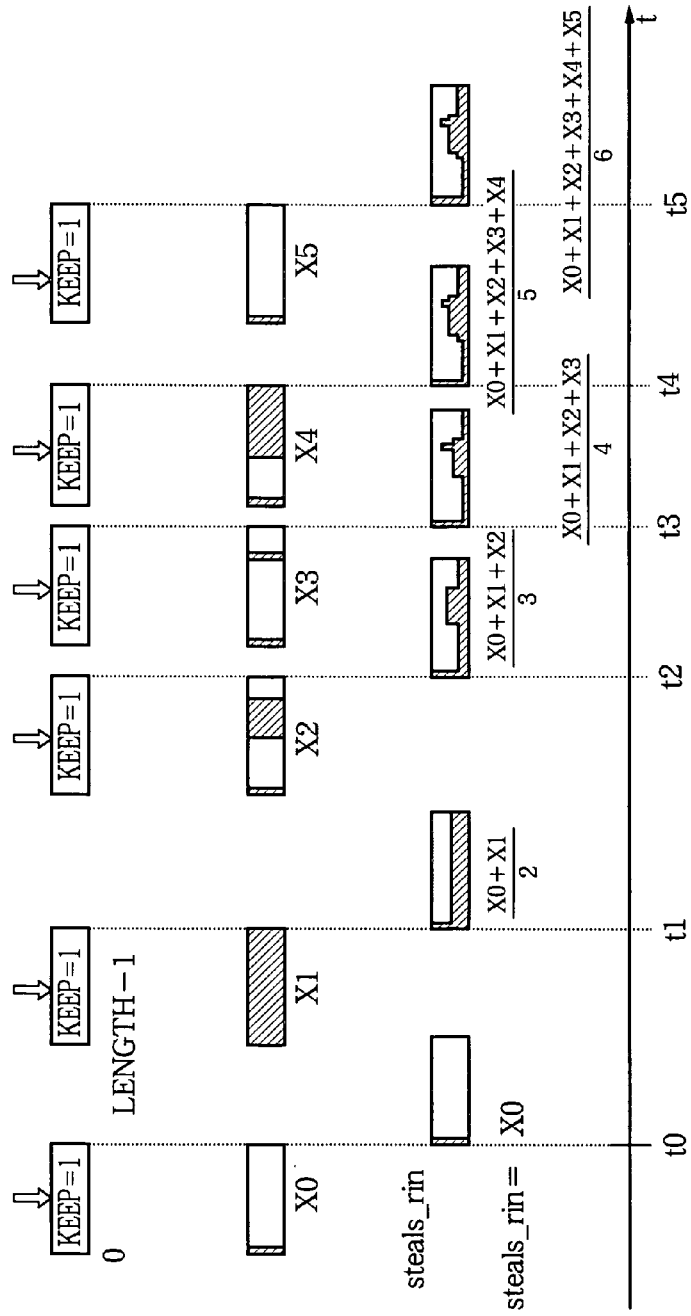
FIGS. 5A to 5D are timing diagrams illustrating the averaging of the simulated far-end input signals in the first embodiment.

FIGS. 5A to 5D further illustrate the averaging process. FIGS. 5A to 5C are identical to FIGS. 3A to 3C: the far-end input signal x(n) is shown in FIG. 5A, the sampling windows in FIG. 5B, and the data vectors X0 to X5 in FIG. 5C. At time t0, gated data register 211 has stored only one data vector X0 of the samples x(n). Accordingly, vector averager 221 outputs data vector X0 as the first averaged vector steals_rin as shown in FIG. 5D. At time t1, when data vectors X0 and X1 are stored, a second averaged vector steals_rin is generated: steals_rin=(X0+X1)/2, as indicated by the hatching in FIG. 5D. At times t2 to t5, vector averager 221 receives further data vectors and calculates new averaged vectors steals_rin. In order to reduce the quantity of data involved in the averaging operations, a predetermined time margin δAV may be provided before the averaged vector steals_rin is input to the silent adaptive filter section 20. For a 16-kHz sampling rate, a preferred margin δAV is 10 ms (160 samples).

After time t5, each time a new data vector Xn is received, a new averaged vector steals_rin is calculated from the six most recently received data vectors. Pile_cnt remains set at the predetermined maximum number FULL_PILE (FULL_PILE=6) without being incremented further. Similarly, vector averager 222 generates averaged vectors steals_sin from data vectors Yn of samples of the echo and outputs these averaged vectors at the same timing. Vector register 231 receives and stores the averaged vectors steals_rin generated in vector averager 221. Vector register 232 receives and stores the averaged vectors steals_sin generated in vector averager 222.

Each time the averaging process is completed, vector averager 221 asserts the steals_adapt_go control signal (steals_adapt_go=1), indicating to the adaptive mode controller 50 that preparations for updating the tap coefficients in the silent state are complete. The adaptive mode controller 50 controls the adaptation mode according to the steals_adapt_go control signal and the v_flg control signal received from the voice detector 30.

Referring to FIG. 6, when the steals_adapt_go control signal from vector averager 221 or the v_flg control signal from the voice detector 30 is asserted, either the normal adaptive filter section 10 or the silent adaptive filter section 20 carries out adaptation operations. The normal adaptive filter section 10 and the silent adaptive filter section 20 do not both carry out adaptation operations simultaneously. The normal adaptive filter section 10 carries out adaptation operations only when the voice detector 30 detects the active state (v_flg=1). The silent adaptive filter section 20 carries out adaptation operations only when the voice detector 30 detects the silent state (v_flg=0) and the steals_adapt_go control signal is active (steals_adapt_go=1). As noted above, steals_adapt_go becomes active at the completion of an averaging calculation.

Figure 7:
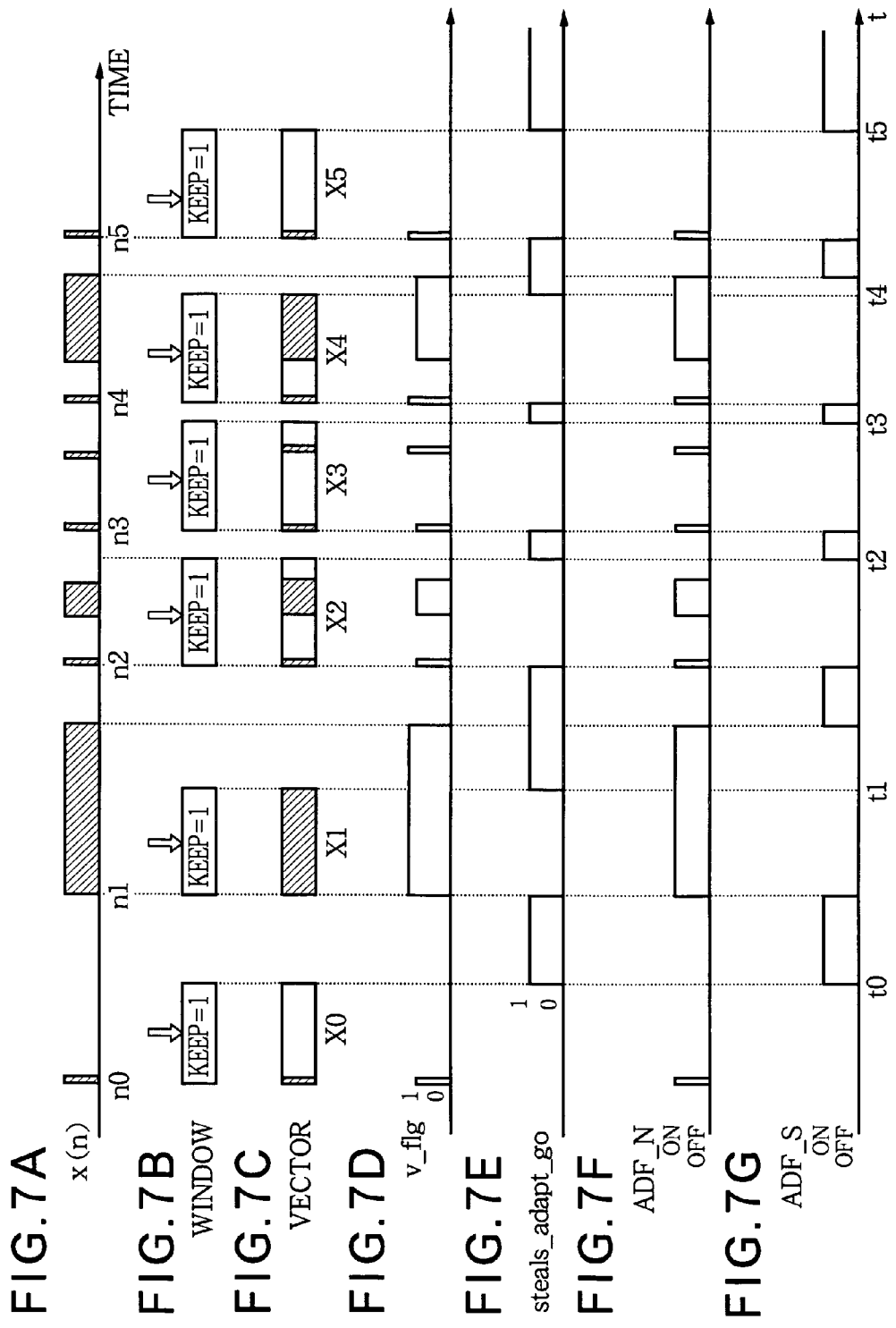
FIGS. 7A to 7G are timing diagrams illustrating flag states during the averaging process in the first embodiment.

FIGS. 7A to 7G further illustrate the averaging process. The far-end input signal x(n) is shown in FIG. 7A, the sampling windows are shown in FIG. 7B, and the data vectors X0 to X5 are shown in FIG. 7C; since FIGS. 7A to 7C are identical to FIGS. 5A to 5C, descriptions will be omitted. As shown in FIG. 7D, the v_flg control signal is asserted (v_flg=1) when the voice detector 30 detects the active state and is reset (v_flg=0) when the voice detector 30 detects the silent state. As shown in FIG. 7E, the steals_adapt go control signal is asserted (steals_adapt_go=1) at the end of a sampling window, when one pair of vectors steals_rin and steals_sin is ready for input, and is reset (steals_adapt_go=0) at the beginning of the next sampling window, when the collection of data for the next pair of vectors begins.

The control signal ADF_N supplied from the adaptive mode controller 50 to the normal adaptive filter section 10 is shown in FIG. 7F. The normal adaptive filter section 10 carries out adaptation operations when ADF_N is active (ADF_N=ON), and does not carry out adaptation operations when ADF_N is inactive (ADF_N=OFF).

The control signal ADF_S supplied from the adaptive mode controller 50 to the silent adaptive filter section 20 is shown in FIG. 7G. The silent adaptive filter section 20 carries out adaptation operations when ADF_S is active (ADF_S=ON), and does not carry out adaptation operations when ADF_S is inactive (ADF_S=OFF). As noted above, the silent adaptive filter section 20 carries out adaptation operations only when the voice detector 30 detects the silent state (v_flg=0) and the steals_adapt_go control signal is active (steals_adapt_go=1). When both control signals are active (steals_adapt_go=1 and v_flg=1), the silent adaptive filter section 20 does not carry out adaptation operations; the silent adaptive filter section 20 operates only while the received far-end signal is silent.

As also noted above, the averaged vector steals_sin=[sin_keep[0], . . . , sin_keep(LENGTH−1)] is generated and sent to vector register 232 at the same timing as the timing at which the averaged vector steals_rin=[rin_keep[0], . . . , rin_keep(LENGTH−1)] is generated and sent to vector register 231.

The silent adaptive filter section 20 uses the data stored in the vector registers 231, 232 to update the tap coefficients it is preparing for the normal adaptive filter section 10.

Next, the operation of the silent adapter 24 (FIG. 2) will be described.

Data register 243 receives the elements rin_keep[k] one by one from vector register 231. In this embodiment, the initial values in data register 243 are all zero, and data register 243 is reset to all zeros at each 0-to-1 transition of the steals_adapt_go control signal from the adaptive mode controller 50. This is not a limitation, however; new data may be sequentially overwritten on old data without resetting the old data to zero. Coefficient register 241 stores N tap coefficients, the same as the number of tap coefficients stored in coefficient register 111 in the normal adaptive filter section 10. The tap coefficients stored in coefficient register 241 can be represented by a vector W(m) expressed by the following equation (11). The letter m indicates the sample number.

$$W(m)=[W(0), W(1), \ldots, W(N-1)]^t \quad (11)$$

Coefficient register 241 resets W(m) to the zero vector at the start of operation and continues to update the coefficients thereafter without resetting W(m) again. The elements of the averaged vector steals_rin, from rin_keep[0] to rin_keep (LENGTH−1), are shifted one by one into data register 243. Data register 243 stores N of these elements as a simulated far-end data vector Sx(m) expressed by the following equation (12).

$$Sx(m)=[Sx(m), Sx(m-1), \ldots, Sx(m-N+1)]^t \quad (12)$$

When the sample number is equal to zero (m=0), since data register 243 has received only a single element rin_keep[0], the stored sample vector Sx(0) is expressed by the following equation (13).

$$Sx(0)=[rin\_keep[0], 0, \ldots, 0]^t \quad (13)$$

Convolver 242 convolves the data vector Sx(m) with the vector W(m), by multiplying the data values by the corresponding coefficient values and summing the results, generates a simulated echo replica signal Sy'(m) internal to the silent adaptive filter section 20, and sends it to the subtractor 25. The simulated echo replica signal Sy'(m) is expressed by the following equation (14).

$$Sy'(m)=W^t(m)Sx(m)) \quad (14)$$

The subtractor 25 receives the element sin_keep[m] of the averaged vector steals_sin from vector register 232 at the same timing as the timing at which vector register 231 supplies the element rin_keep[m] of the averaged vector steals_rin, and subtracts the simulated echo replica signal Sy'(m) to generate a simulated residual signal Se(m), which is sent to the silent coefficient adapter 244. The silent coefficient adapter 244 updates the coefficient vector W(m) to a vector W(m+1) expressed by the following equation (15).

$$W(m+1) = W(m) + \alpha \frac{Sx(m)Se(m)}{\sum_{i=0}^{N-1} Sx^2(m-i)} \quad (15)$$

The updated coefficient vector W(m) is sent to switch 13 (FIG. 1). Because the v_flg control signal is inactive, switch 13 is connected to terminal_a1, so the updated coefficient vector W(m) is overwritten on the coefficient vector H(m) stored in the normal adaptive filter section 10, as expressed by the following equation (16).

$$H(m) = W(m) \quad (16)$$

When the active state is next detected and the normal adaptive filter section 10 is restarted, the most recent values of coefficient vector W(m) are used as the initial values of coefficient vector H(m).

The first embodiment has the following effects.

Vector averager 221 averages data vectors of samples of the far-end input signal to generate a simulated far-end input signal and vector averager 222 averages data vectors of samples of the echo to generate a simulated near-end input signal. The simulated input signals accordingly include a mixture of audio components and have a comparatively flat frequency spectrum, avoiding the problem of slow convergence of the NLMS echo canceling algorithm for colored signals having a non-flat frequency spectrum.

When the far-end input signal is active, the normal adaptive filter section 10 adapts, converges, and reduces the echo component. Simultaneously, the silent adaptive filter section 20 stores data vectors including samples of the far-end and near-end input signals and prepares to continue the adaptation process in the silent state. In the silent state, while the normal adaptive filter section 10 is halted, the silent adaptive filter section 20 simulates the adaptation process in the normal adaptive filter section 10, using simulated input signals obtained by averaging the stored data vectors, to generate tap coefficients that continue to converge. When the active state resumes, these tap coefficients provide a starting point from which the normal adaptive filter section 10 can adapt and converge quickly without the need for computationally expensive high-speed algorithms of uncertain stability. The echo component is therefore removed rapidly and reliably without an increased computational load.

Second Embodiment

Figure 8:
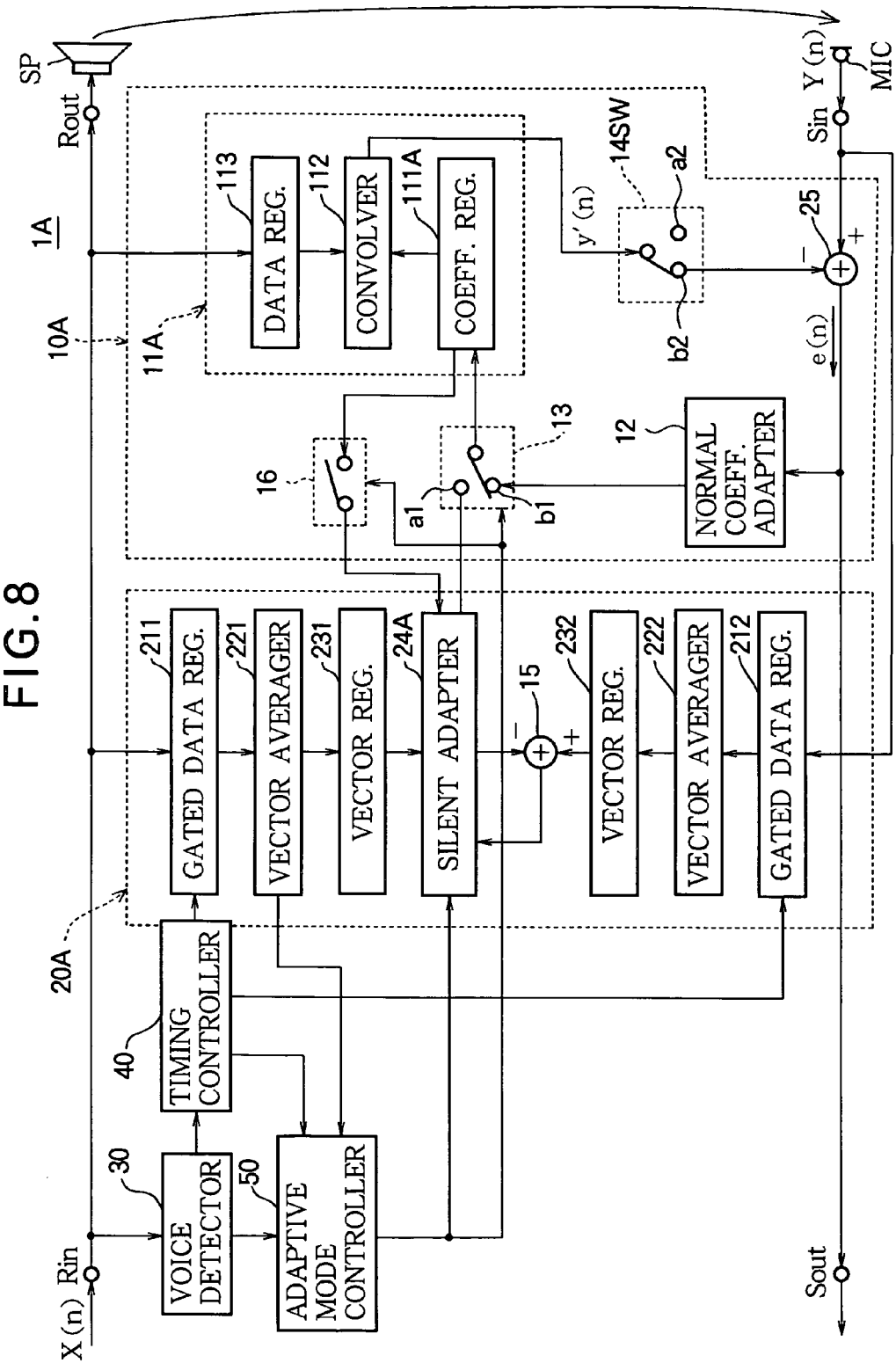
FIG. 8 is a block diagram illustrating an echo canceler according to a second embodiment.

Referring to the block diagram in FIG. 8, the echo canceler 1A in the second embodiment differs from the echo canceler 1 in the first embodiment in that the normal adaptive filter section 10A includes a modified coefficient register 111A, the silent adaptive filter section 20A includes a modified silent adapter 24A, and the normal adaptive filter section 10A includes a switch 16 disposed between the modified coefficient register 111A and silent adapter 24A. Under control of the adaptive mode controller 50, switch 16 connects coefficient register 111A to the silent adapter 24A or disconnects coefficient register 111A from the silent adapter 24A.

Figure 9:
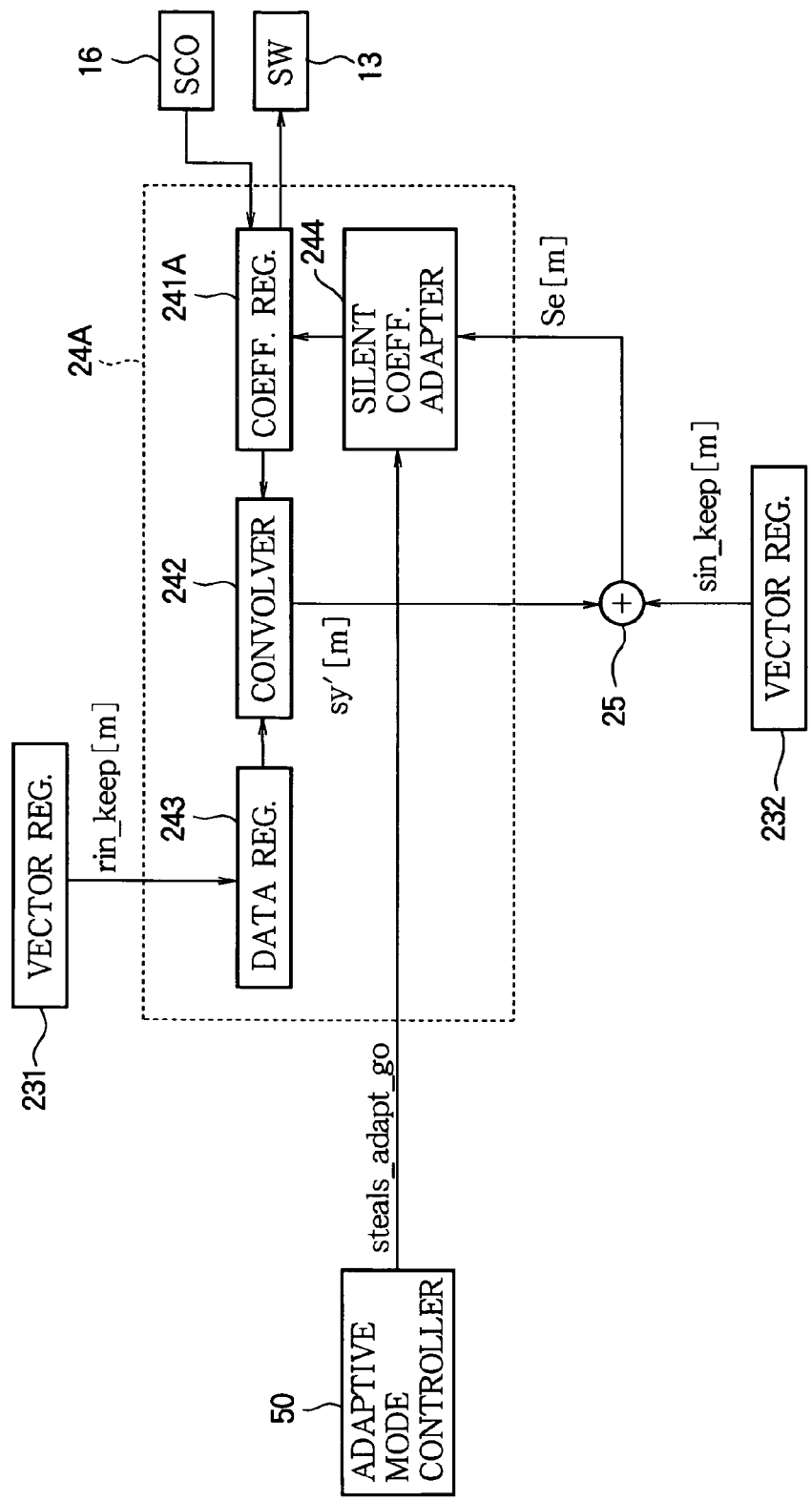
FIG. 9 is a block diagram illustrating the internal structure of the silent adapter in the second embodiment.

Referring to FIG. 9, the silent adapter 24A in the second embodiment differs from the silent adapter 24 (FIG. 2) in the first embodiment in that the coefficient register 241A is connected to switch 16. When switch 16 is closed, coefficient register 241A receives a new coefficient vector from the normal adaptive filter section 10A.

Next, the operation of the echo canceler 1A in the second embodiment will be described.

The operation of the second embodiment differs from the operation of the first embodiment in that each time the silent adapter 24A starts operating, the coefficient vector stored in coefficient register 111A in the normal adaptive filter section 10A is copied to coefficient register 241A through switch 16.

The coefficient vector W(m) stored in coefficient register 241A is reset to the zero vector only at the start of operation, with switch 16 initially open. Switch 16 is then closed under control of the adaptive mode controller 50 at each 0-to-1 transition of the steals_adapt_go control signal from the adaptive mode controller 50, and the coefficient vector H(m) stored in coefficient register 111A immediately before the 0-to-1 transition is copied to coefficient register 241A. When the copying is completed, switch 16 is opened again and the silent coefficient adapter 244 starts adapting the coefficient vector W(m) as explained in the first embodiment. The convolver 242 and silent coefficient adapter 244 can thereby use the most recent values of coefficient vector H(m) as the initial values of coefficient vector W(m). The adapted coefficient vector W(m) is copied back to coefficient register 111A through switch 13 as in the first embodiment.

In the first embodiment, the coefficient vector is copied only from the coefficient register 241 in the silent adaptive filter section 20 to the coefficient register 111 in the normal adaptive filter section 10. In the second embodiment, the coefficient vector is copied in both directions, so adaptation proceeds with better continuity between the echo replicator 11A and the silent adapter 24A.

This feature of the second embodiment is particularly valuable when the averaging process performed in vector averager 221 or 222 fails to produce a flat frequency spectrum. This occurs when, for example, the invention is used in a hands-free telephone set and voice input is preceded by a call control tone such as a ringback tone (RBT), which is received in place of far-end voice input.

An RBT in which a signal with a frequency of 400 Hz±20 Hz is modulated by a signal with a frequency of 15 to 20 Hz and pulsed at a rate of 20 impulses per minute (20 IPM)±20%, with a make ratio of 33%±10%, is described in Denwa sabisu no intafesu (Telephone service interface), 5th edition, Nippon Telegraph and Telephone Corporation, 1998, p. 19. Roughly speaking, this RBT, which is used in Japan, is a 400-Hz tone in which one-second pulses alternate with two-second pauses. When the first embodiment receives a colored signal such as this RBT, the temporal length of the echo path cannot be determined but the voice detector 30 detects the 400 Hz tone, and because of the averaging process performed in the silent adaptive filter section 20, the silent adaptive filter section 20 generates simulated 400-Hz input signals.

Since in the first embodiment the coefficient vector is copied only from the silent adaptive filter section 20 to the normal adaptive filter section 10, each time this copying occurs, the convergence that has taken place so far in the normal adaptive filter section 10 is lost. In particular, during conversational voice input preceded by an RBT, until new data have been overwritten on all the RBT data stored in data register 243 in the silent adaptive filter section 20, the normal adaptive filter section 10 must always start adapting from a coefficient vector derived at least partly from a simulated RBT input signal having a non-flat frequency spectrum utterly unlike a voice frequency spectrum. While this state persists, any improvement in speech quality obtained by wideband telephony is likely to be offset by unremoved echo.

The second embodiment has the following effects in addition to the effects in the first embodiment.

By providing a third switch 16 controlled by the adaptive mode controller 50, the second embodiment enables the coefficient vector H(m) stored in coefficient register 111A immediately before a 0-to-1 transition of the steals_adapt_go control signal to be copied to coefficient register 241A, becoming the coefficient vector W(m). In the next silent state after the 0-to-1 transition, the silent coefficient adapter 244 can start updating this new coefficient vector W(m), instead of continuing to update the old W(m) coefficient vector left from the previous silent state. In effect, the normal adaptive filter section 10 and the silent adaptive filter section 20 take turns updating the same set of tap coefficients, the normal adaptive filter section 10 using actual far-end and near-end signal data in the far-end active state, the silent adaptive filter section 20 using simulated signal data in the far-end silent state. Accordingly, even if the simulated data are derived from a colored signal such as an RBT, the convergence process is not drastically interrupted and the echo component is rapidly removed.

In a variation of the second embodiment, if a 0-to-1 transition of the steals_adapt_go control signal occurs while the far-end signal is active (v_flg=1), the adaptive mode controller 50 leaves switch 16 closed until the far-end signal becomes silent, allowing copying of H(m) to W(m) to continue until that time, so that the silent coefficient adapter 244 can start adaptation from the most recent tap coefficient values obtained by the normal adaptive filter section 10. Alternatively, switch 16 can be closed for a single vector copying operation at each of the following times: a 0-to-1 transition of the steals_adapt go control signal while the v_flg control signal is active (v_flg=1); a 1-to-0 transition of the v_flg control signal while the steals_adapt_go control signal is active (steals_adapt_go=1); a simultaneous 1-to-0 transition of the v_flg control signal and 0-to-1 transition of the steals_adapt_go control signal.

Third Embodiment

Figure 10:
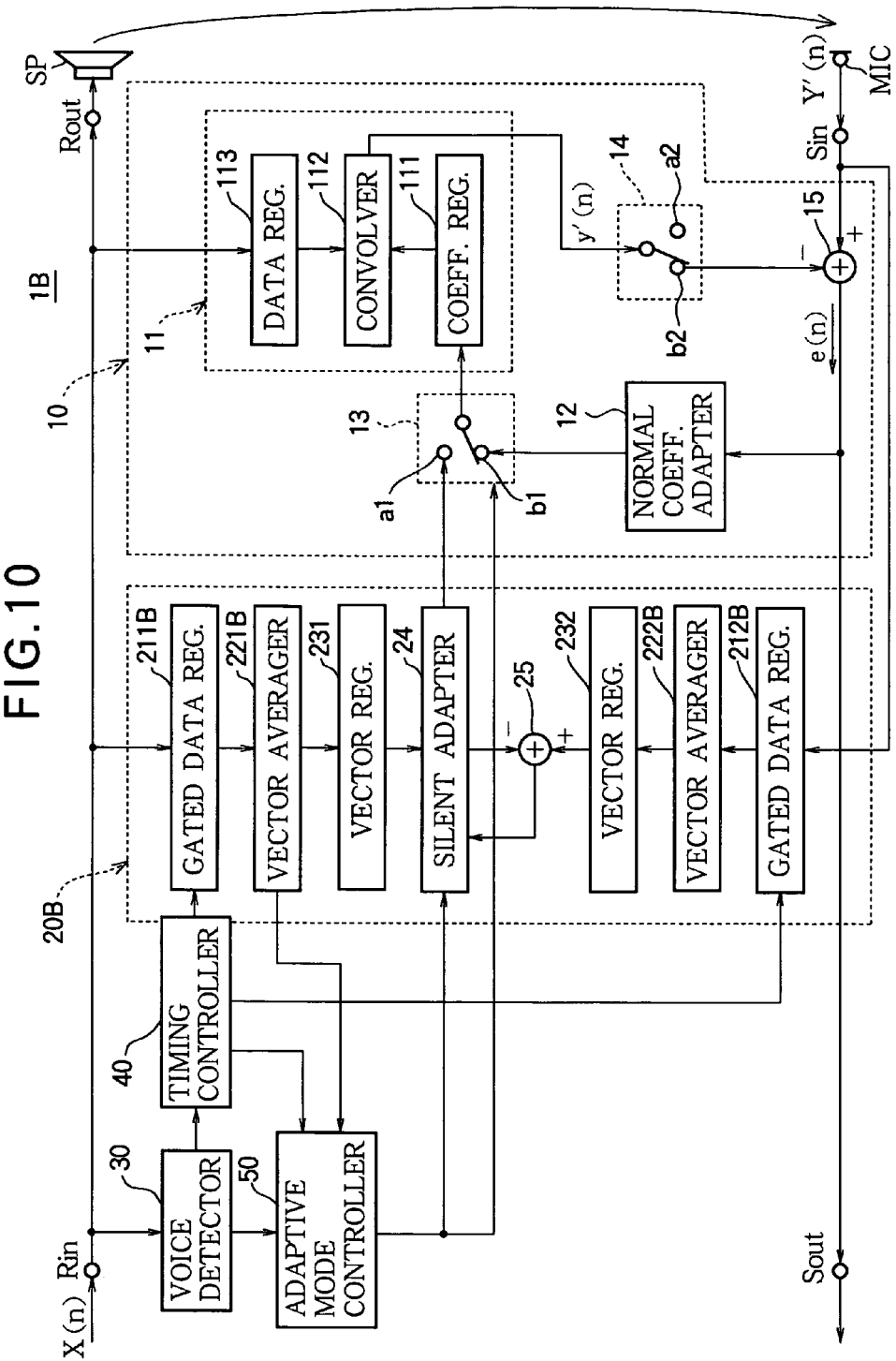
FIG. 10 is a block diagram illustrating an echo canceler according to a third embodiment.

Referring to FIG. 10, the echo canceler 1B in the third embodiment differs from the echo canceler 1 (FIG. 1) in the first embodiment in that the silent adaptive filter section 20B includes modified gated data registers 211B, 212B and modified vector averagers 221B, 222B.

The gated data registers 211B, 212B in the third embodiment differ from the first embodiment in that they store only one data vector apiece. The vector averagers 221B, 222B in the third embodiment differ from the vector averagers 221, 222 in the first embodiment in that they calculate a weighted average, more precisely an exponential moving average.

Next, the operation of the echo canceler 1B in the third embodiment will be described.

As in the preceding embodiments, the data vector X(n) received at time n is expressed by the following equation (17).

$$X(n)=[x(n), x(n-1), \ldots, x(n-N+1)]^t \quad (17)$$

If K0, K1, . . . , Kn, . . . are successive timings at which the timing signal is asserted (keep_flg_on_to_off=1), where n is an arbitrary positive integer, at each of these timings after K0, vector averager 221B calculates a weighted average as described below.

At timing Kn, gated data register 211B stores a new data vector X(Kn), also denoted x(K(n)) below. Gated data register 212B stores a new data vector Y(Kn), also denoted y(K(n)) below. Vector register 231 stores an existing averaged data vector steals_rin(Kn−1), also denoted steals_rin[(K(n−1))]. Vector register 232 stores an existing averaged data vector steals_sin(Kn), also denoted steals_sin [(K(n−1))]. The timings Kn at which the data vectors are stored are not cyclical like the sampling timings but are controlled by the v_flg control signal output by the voice detector 30 on the basis of activity at the receiving input terminal Rin.

At timing K0, the first data vector X(K0)=[x(K0), x(K0−1), . . . , x(K0−N+1)] t is used as the first averaged vector steals_rin[K(0)].

Thereafter, when the timing signal is asserted (keep_flg_on_to_off=1), vector averager 221B calculates a new averaged vector steals_rin[K(n)] for input to the silent adapter 24 from the data vector X(Kn) stored in gated data register 211B and the previous averaged vector steals_rin[K(n−1)] stored in vector register 231, as expressed by the following equation (18).

$$\text{steals\_rin}[K(n)] = \delta\_LPO \cdot x(K(n)) + (1.0 - \delta\_LPO) \cdot \text{steals\_rin}[K(n-1)] \quad (18)$$

δ_LPO is a constant between zero and one (0≦δ_LPO≦1.0) that determines the weight of the new data vector X(Kn) in the new average vector steals_rin[K(n)]. The constant δ_LPO, may be equal to one-half (δ_LPO=0.5), for example.

If the constant δ_LPO is equal to zero (δ_LPO=0), the new averaged vector steals_rin[K(n)] is equal to the previous averaged vector steals_rin[K(n−1)]. If the constant δ_LPO is equal to one (δ_LPO=1.0), the new vector steals_rin[K(n)] is equal to the most recently received data vector X(Kn). In these extreme cases no averaging is performed.

If the constant δ_LPO is strictly between zero and one (0<δ_LPO<1.0), the most recent data vector X(Kn) is weighted against the past data embodied in the preceding averaged vector steals_rin[K(n−1)]. If the constant δ_LPO is greater than one-half (e.g., δ_LPO=0.8) the most recent data vector X(Kn) is given greater weight than the past data.

The vector steals_rin[K(n)] generated by weighted averaging is sent to vector register 231 for input to the silent adapter 24 as in the first embodiment.

The operation of vector averager 222B differs from the operation of vector averager 221B only in that it receives a data vector Y(Kn) representing the echo instead of a data vector X(Kn) representing the far-end input signal. Vector averager 222B uses data vector Y(Kn) and the preceding averaged vector steals_sin [K(n−1)] stored in vector register 232 to obtain a new averaged vector steals_sin [K(n)] by the calculation in the following equation (19). The operation after the weighted averaging process is as described in the first embodiment.

$$\text{steals\_sin}[K(n)] = \delta\_LPO \cdot y(K(n)) + (1.0 - \delta\_LPO) \cdot \text{steals\_sin}[K(n-1)] \quad (19)$$

The third embodiment has the following effects.

When a signal processor such as an echo canceler is implemented on a conventional digital signal processor (DSP), memory-to-memory data transfers must be accomplished within the computational constraints imposed by the DSP. Although these data transfers, which occur mainly when data are moved or copied, consume the computational resources of the DSP, they do not appear in the equations that define the echo canceling algorithm and often go unnoticed until the algorithm is implemented and a shortage of DSP computational resources is discovered. This is particularly likely to happen in the second embodiment, which involves much copying of the coefficient vector between the coefficient register 111A in the normal adaptive filter section 10A and the coefficient register 241A in the silent adaptive filter section 20A.

In the third embodiment, the constant δ_LPO can be set to give new data any desired weight in relation to old data. If the weight assigned to the new data is sufficiently high, the effect of a past tone signal in the simulated far-end data can be made to fade to an insignificant level quickly even if the coefficient vector stored in the coefficient register in the normal adaptive filter section is not copied to the coefficient register in the silent adaptive filter section as in the second embodiment. The third embodiment can accordingly provide the same effect as the second embodiment in rapidly removing echo from a voice conversation preceded by a tone or other special signal without requiring the extra copying of coefficient data that was necessary in the second embodiment. Moreover, since the gated data registers 211B, 212B only store one data vector apiece, the third embodiment requires less memory space for storing far-end and near-end input vectors, enabling the circuit size of the echo canceler to be reduced.

Fourth Embodiment

Figure 11:
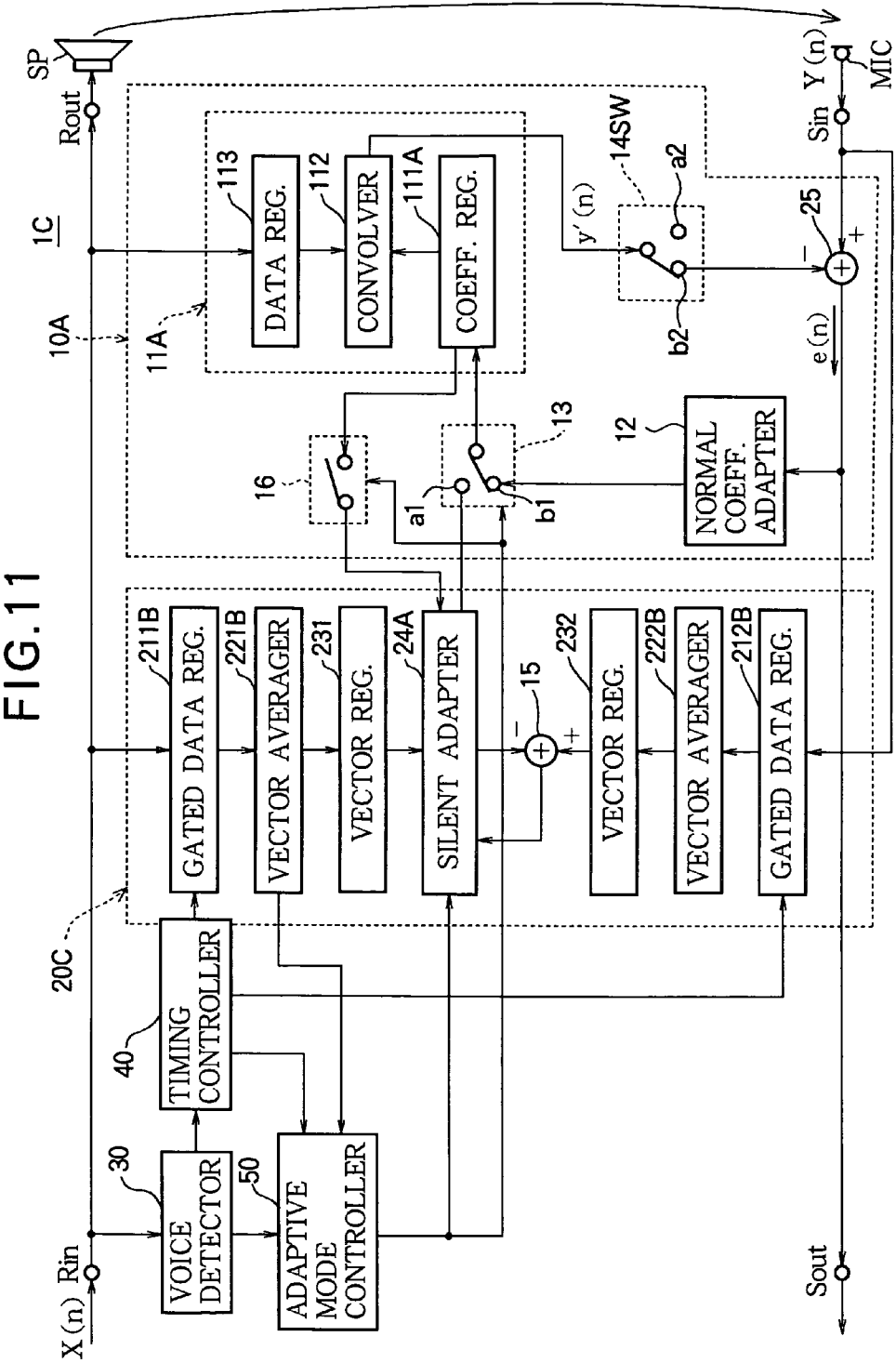
FIG. 11 is a block diagram illustrating an echo canceler according to a fourth embodiment.

The fourth embodiment combines the features of the second and third embodiments. Referring to FIG. 11, the echo canceler 1C in the fourth embodiment differs from the echo canceler 1A (FIG. 8) in the second embodiment in that the silent adaptive filter section 20C includes modified gated data registers 211B, 212B and modified vector averagers 221B, 222B.

The operation of the echo canceler 1C in the fourth embodiment differs from the operation of the echo canceler 1A in the second embodiment in that the gated data registers 211B, 212B only store one data vector apiece and the vector averagers 221B, 222B calculate an exponential moving average, as described in the third embodiment.

The fourth embodiment has the following effects.

In the fourth embodiment, as in the second embodiment, the normal adaptive filter section 10C and the silent adaptive filter section 20C alternately update the same set of tap coefficients. Accordingly, even if a special signal such as a call control tone is received when the echo canceler starts operating, when the special signal ends, adaptation is quick and the echo component is rapidly removed. Additionally, as in the third embodiment, less memory space is required for storing far-end and near-end input vectors, so a smaller and less expensive echo canceler can be provided.

The invention is not limited to the first to fourth embodiments. The following are some of the possible variations.

The echo cancelers in the preceding embodiments may be applied not only to hands-free telephone sets, but also to teleconferencing systems using personal computers equipped with so-called softphone facilities for hands-free telephone operation, and to other such systems.

In each of the embodiments described above, for example, the echo canceler may have an additional double-talk detector for detecting the so-called double-talk state when voice input is received from the near and far ends simultaneously, and may be controlled so as to prevent the gated data registers from collecting received samples in the double-talk state. In the double-talk state the gated data registers may store dummy data samples X(n) and Y(n) that simulate the silent state, for example. Alternatively, the gated data registers may simply stop collecting samples X(n) and Y(n), or clear all their collected sample data.

Those skilled in the art will recognize that further variations are possible within the scope of the invention, which is defined in the appended claims.

What is claimed is:

1. An echo canceler having a filter for generating an echo replica signal from a far-end input signal and an echo-component remover for using the echo replica signal to remove an echo component included in a near-end input signal, the echo canceler comprising:
   a voice detector for detecting an active state and a silent state of the far-end input signal;
   a filter coefficient adapter for iteratively determining first coefficients for the filter from the near-end input signal, after removal of the echo component, and setting the determined filter coefficients in the filter while the active state is detected by the voice detector;
   a data selector for sampling the far-end input signal and the near-end input signal;
   a simulated signal generator for generating a simulated far-end input signal from samples of the far-end signal obtained by the data selector and a simulated near-end input signal from samples of the near-end input signal obtained by the data selector;
   an initial coefficient calculator for calculating, from the simulated far-end input signal and the simulated near-end input signal, second coefficients for removing an echo of the simulated far-end signal from the simulated near-end input signal; and
   a first initializer for setting the second coefficients calculated by the initial coefficient calculator in the filter, replacing the first coefficients, when the voice detector detects a transition from the silent state to the active state.

2. The echo canceler of claim 1, wherein the initial coefficient calculator further comprises:
   a data register for storing the simulated far-end signal;
   a coefficient register for storing the second coefficients;
   a convolver for convolving the simulated far-end signal stored in the data register with the second coefficients stored in the coefficient register to generate a simulated echo replica signal;
   a subtractor for subtracting the simulated echo replica signal from the simulated near-end signal to generate a simulated residual signal; and
   a coefficient adapter for updating the second coefficients stored in the coefficient register according to the simulated residual signal.

3. The echo canceler of claim 1, wherein the data selector samples the far-end input signal and the near-end input signal at a prescribed sampling rate during a sampling window of a prescribed duration starting from a time when the voice detector detects a transition from the silent state to the active state, thereby obtains a far-end data vector comprising samples of the far-end signal and a near-end data vector comprising samples of the near-end signal, and stores the far-end data vector and the near-end data vector.

4. The echo canceler of claim 3, wherein the simulated signal generator generates the simulated far-end input signal by averaging respective elements of a plurality of far-end data vectors obtained by the data selector, and generates the simulated near-end input signal by averaging respective elements of a plurality of near-end data vectors obtained by the data selector.

5. The echo canceler of claim 4, wherein the simulated signal generator calculates a moving average of the plurality of far-end data vectors and calculates a moving average of the plurality of near-end data vectors.

6. The echo canceler of claim 5, wherein the data selector stores the plurality of far-end data vectors and the plurality of near-end data vectors.

7. The echo canceler of claim 6, wherein the data selector stores a predetermined number of most recently obtained far-end data vectors as the plurality of far-end data vectors, and stores a predetermined number of most recently obtained near-end data vectors as the plurality of near-end data vectors.

8. The echo canceler of claim 4, wherein the simulated signal generator calculates a weighted average of the plurality of far-end data vectors and calculates a weighted average of the plurality of near-end data vectors.

9. The echo canceler of claim 4, wherein the simulated signal generator calculates an exponential moving average of the plurality of far-end data vectors and calculates an exponential moving average of the plurality of near-end data vectors.

10. The echo canceler of claim 9, wherein the data selector stores a single far-end data vector and a single near-end data vector.

11. The echo canceler of claim 4, further comprising a vector register for storing the simulated far-end signal as a simulated far-end data vector equal in length to the far-end data vector obtained by the data selector, and storing the simulated near-end signal as a simulated near-end data vector equal in length to the near-end data vector obtained by the data selector, wherein the initial coefficient calculator calculates the second coefficients from the simulated far-end data vector and the simulated near-end data vector stored in the vector register.

12. The echo canceler of claim 1, wherein the initial coefficient calculator calculates the second coefficients only while the voice detector detects the silent state.

13. The echo canceler of claim 12, wherein the initial coefficient calculator calculates the second coefficients only while the data selector is not sampling the far-end signal and the near-end signal.

14. The echo canceler of claim 13, further comprising:
a second initializer for setting the second coefficients as initial coefficient values in the initial coefficient calculator when the data selector stops sampling the far-end signal and the near-end signal.

15. The echo canceler of claim 12, further comprising:
a second initializer for setting the second coefficients as initial coefficient values in the initial coefficient calculator when the initial coefficient calculator next starts calculating the second coefficients.

16. A machine-readable tangible medium storing an echo canceling program executable by a computing device embedded in an echo canceler having a filter for generating an echo replica signal from a far-end input signal and an echo-component remover for using the echo replica signal to remove an echo component included in a near-end input signal, the echo canceling program comprising instructions for:
detecting an active state and a silent state of the far-end input signal;
iteratively determining coefficients for the filter from the near-end input signal and setting the determined filter coefficients in the filter while the active state is detected by the voice detector;
sampling the far-end input signal and the near-end input signal to obtain samples when the active state is detected;
generating a simulated far-end input signal from the samples obtained by sampling the far-end input signal and generating a simulated near-end input signal from the samples obtained by sampling the near-end input signal;
calculating, from the simulated far-end input signal and the simulated near-end input signal, second coefficients for removing an echo of the simulated far-end signal from the simulated near-end input signal; and
setting the second coefficients in the filter, replacing the first coefficients, when a transition from the silent state to the active state is detected.

* * * * *